United States Patent [19]

Morgan

[11] 4,273,099
[45] Jun. 16, 1981

[54] SOLAR HEATED BUILDING

[75] Inventor: Burton D. Morgan, Hudson, Ohio

[73] Assignee: Concept Development Institute, Inc., Hudson, Ohio

[21] Appl. No.: 48,549

[22] Filed: Jun. 14, 1979

[51] Int. Cl.³ ............................................. F24J 3/02
[52] U.S. Cl. ....................................... 126/426; 52/2; 52/86; 126/442; 160/86
[58] Field of Search .............. 126/416, 426, 428, 431, 126/442; 52/86, 2, 72; 160/86

[56] References Cited

U.S. PATENT DOCUMENTS

| | | | |
|---|---|---|---|
| 1,201,916 | 10/1916 | Back | 160/86 |
| 2,594,867 | 4/1952 | Carmona | 160/86 |
| 3,236,290 | 2/1966 | Lueder | 160/241 |
| 3,244,186 | 4/1966 | Thomason | 126/428 |
| 3,311,160 | 3/1967 | Barbaur | 160/271 |
| 3,776,805 | 12/1973 | Hansen | 52/2 |
| 4,027,437 | 6/1977 | Monsky | 126/431 |
| 4,051,834 | 10/1977 | Fletcher | 126/426 |
| 4,108,373 | 8/1978 | Chiapale | 126/428 |

FOREIGN PATENT DOCUMENTS

| | | | |
|---|---|---|---|
| 503390 | 12/1954 | Italy | 160/86 |
| 686944 | 2/1953 | United Kingdom | 160/86 |

Primary Examiner—Herbert F. Ross
Attorney, Agent, or Firm—Oldham, Oldham, Hudak & Weber Co.

[57] ABSTRACT

The solar heated building comprises a flexible tube of transparent plastic sheeting adapted to be positioned on, or secured to, a building or anchor unit so as to form the top cover therefor, a pair of shafts engaging spaced internal portions of the tube and extending longitudinally thereof, the tube having closed ends and being positioned to move peripherally, rollers engaging the plastic sheeting and forcing it against the shafts, whereby, on drive of the rollers, the flexible transparent tube can be moved around its periphery, the transparent tube having at least one longitudinally extending section therein with a reflective metal flexible layer thereon, whereby, when the reflective metal layer portion of the tube is so positioned on the roof or cover unit as to receive the sun's rays thereon, they are reflected whereas the flexible plastic tube can be moved around its periphery to have only transparent plastic sheeting receive the sun's rays for transmission of the light's rays therethrough to transmit heat to the building.

6 Claims, 9 Drawing Figures

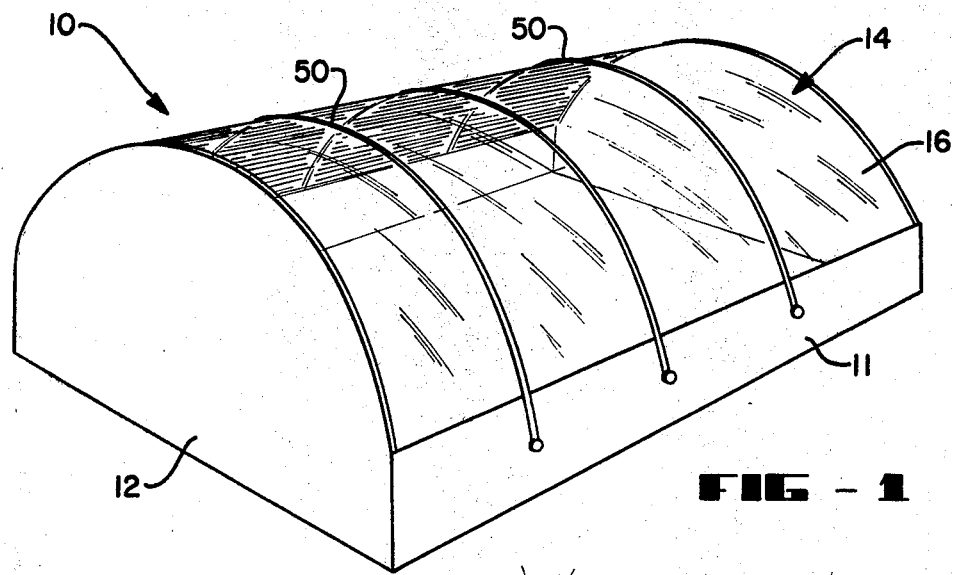
FIG - 1
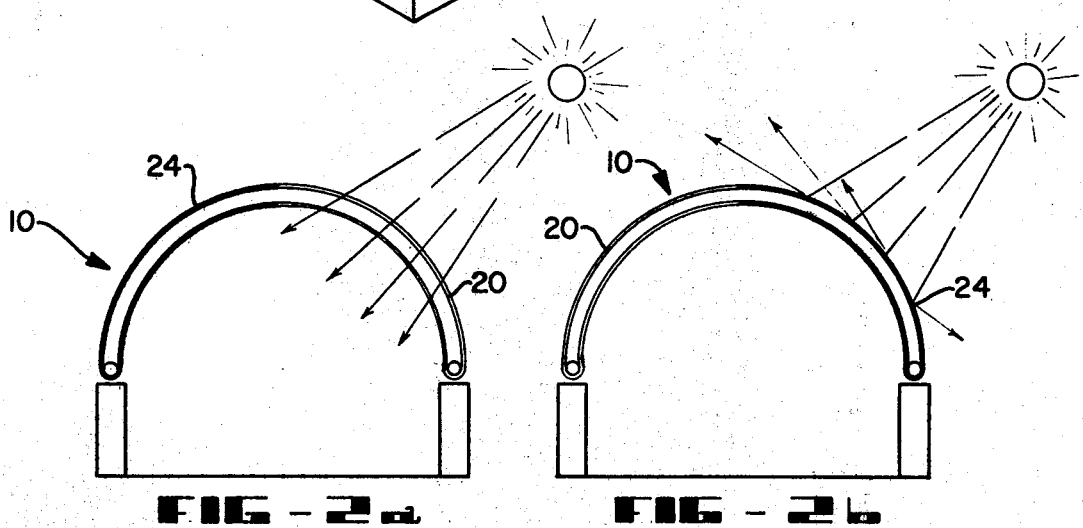
FIG - 2a
FIG - 2b
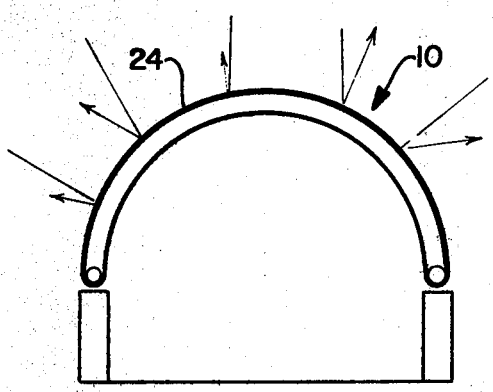
FIG - 2c
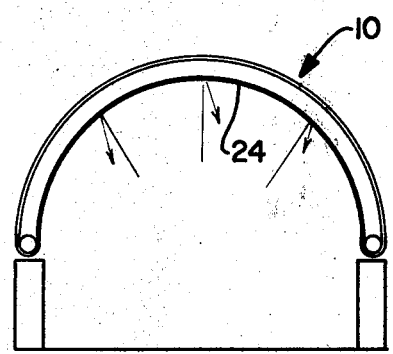
FIG - 2d

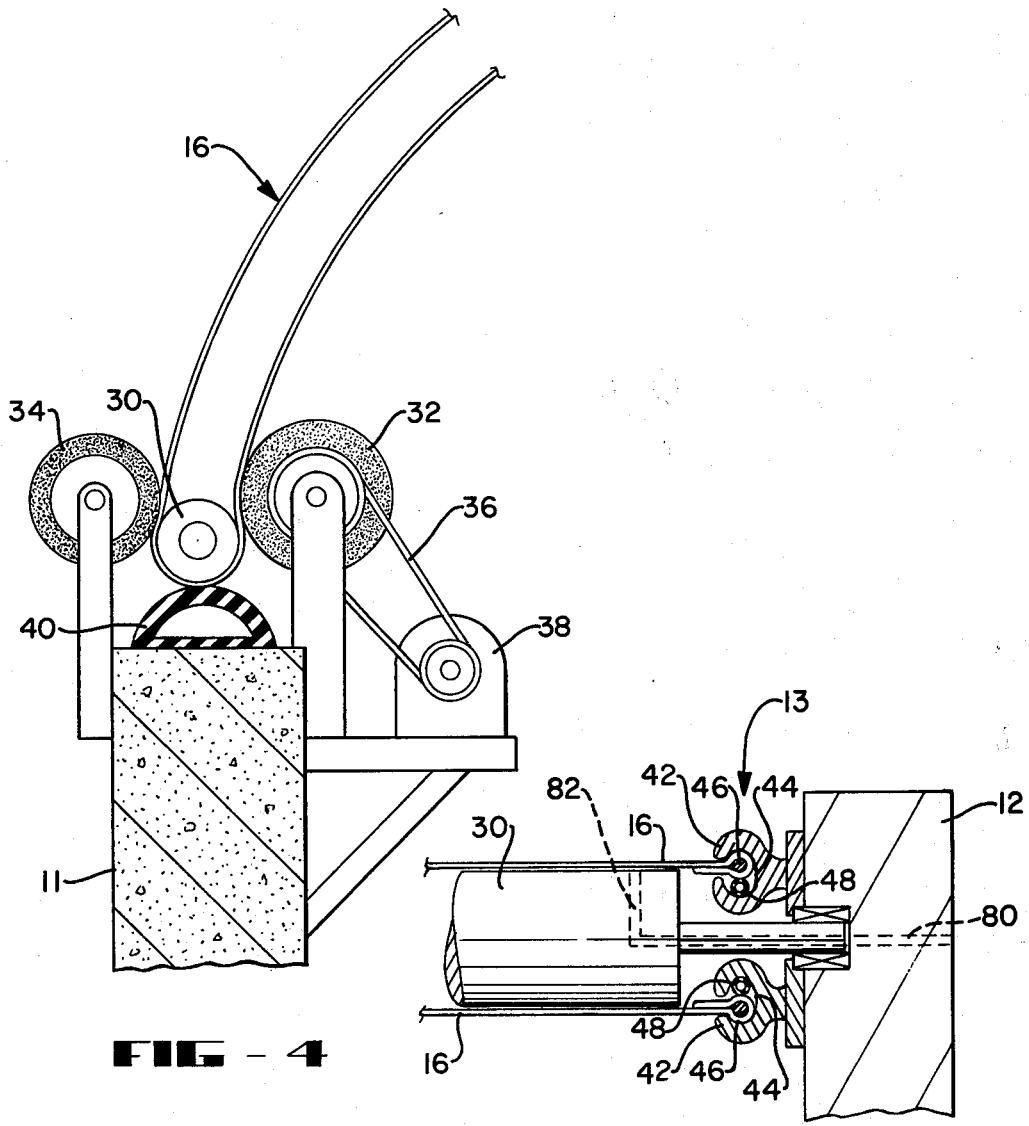

SOLAR HEATED BUILDING

BACKGROUND OF THE INVENTION

It is well known that energy sources are becoming in more limited supply in the world, and appreciably more scientific effort is being continually directed to the use of natural energy sources and, in particular, solar heat. Many of these structures now proposed as solar heated units involve complicated mechanisms and/or heat transfer mediums, or else the solar heat heated units are costly to produce and they may not function efficiently.

The general object of the present invention is to provide a novel and improved solar heated building involving the use of a flexible tube of transparent plastic sheeting positioned to form a double-walled cover over the building, and wherein a longitudinally extending portion of the tube is provided with an integral, flexible, metallized coating thereon which can be brought into position for reflecting the sun's rays from the building enclosure, or can be positioned to transmit light rays therethrough, as desired.

Another object of the invention is to provide a relatively uncomplicated, inflated plastic tube adapted for use as a cover on a building unit, and wherein the tubular cover is engaged with and is driven by a portion of its support means so that the tube can be rotated around on its periphery to present alternate axially extending portions of the tube for receiving the sun's rays thereon.

Other objects of the invention are to provide a flexible, transparent enclosure means for use in a solar heated building; to provide a flexible sheeting laminate made from a temperature and atmosphere resistant plastic layer or sheet, and other layers or sheets including a layer of a flexible light reflecting metallized material; to provide resilient drive wheels engaging a portion of an inflated tube to secure it against a support or positioning shaft, whereby when the drive wheels are rotated, they can produce rotation of the flexible tubing around the two support shafts provided therefor; to provide an inflatable cover means for a structure that can be engaged with end members and side members of a building to provide good sealed engagement therewith, even though the cover means is mounted to be rotated around its own periphery.

The foregoing and other objects and advantages of the invention will be made more apparent as the specification proceeds.

With reference to the accompanying drawings:

FIG. 1 is a perspective view of a building, shown diagrammatically, that has an enclosure or cover means of the invention operatively associated therewith to provide a solar heated building;

FIGS. 2a, 2b, 2c and 2d, respectively, are diagrammatic views showing how the cover or enclosure means of the invention would be positioned for transmitting the sun's light rays therethrough, for reflecting the sun's light rays therefrom, for forming a reflective surface on the outer portion of the enclosure means; and for forming a light reflective surface on the inner layer of the cover means, respectively;

FIG. 3a shows the laminate of the enclosure member with light rays being transmitted therethrough;

FIG. 3b shows the laminate cover means of the invention with the light rays being reflected therefrom;

FIG. 4 is a fragmentary enlarged vertical section of an edge portion of the tubular enclosure member of the invention showing it operatively engaged with drive and seal means associated therewith, for mounting the enclosure operatively; and FIG. 5 is a fragmentary sectional view of an edge seal for the cover means.

When referring to corresponding members shown in the drawings and referred to in the specification, corresponding numerals are used to facilitate comparison therebetween.

SUBJECT MATTER OF THE INVENTION

The solar heated building of the invention, as one embodiment thereof, includes a roof or enclosure means comprising a flexible, transparent tube of plastic sheeting adapted to extend over the top of the building, and means engage and position the tube to move it around its periphery, the tube having a light reflective area and a light transmitting area, each extending the length of the tube and being alternately presentable to have the sun's rays either reflected therefrom or transmitted therethrough, respectively, the solar heated building and the roof may include a pair of parallel support shafts rotatably positioned within the tube to engage and support the tube, a pair of control roller means rotatably engaging each of the support shafts to press the wall of the plastic tube thereagainst, and drive means for the control roller means whereby rotation of the same will move the plastic tube wall to rotate it around its peripheral outline, as determined by its inflation and the positioning and control means provided therefor, the tube also in some instances having reenforcing cable means associated therewith extending over an upper portion thereof to aid in securing it to a building. The tube, having end portions in sealed engagement with the end portions of the building, but yet permitting the peripheral movement of the tube as outlined hereinabove.

Reference now is particularly made to the details of the structure shown in the drawings, and FIG. 1 indicates diagrammatically a solar heated building indicated as a whole by the numeral 10. This building 10 may have any suitable side walls 11 and end walls 12 provided therefor, and the building is provided with an enclosure member or roof 14. This roof is made from a tubular structure formed from a plastic sheeting layer, and it extends arcuately over the building 10 to form a roof means therefor. It bridges over between a pair of the opposed side walls 11 to cover the structure.

End portions of this roof means 14 are in sealed engagement with end portions of the building as described hereinafter.

The roof or enclosure 14 preferably is formed from a flexible plastic sheet laminate 16, and it normally is provided from a relatively thick, strong transparent plastic material layer 18, such as a 10 mil layer of a vinyl plastic, forming the inner or bottom layer of the sheet or laminate 16, while an outer layer 20 is made of weather resistant plastic material, transparent, such as a Tedlar type of a plastic, and which is suitably laminated to a transparent Mylar middle layer 22. The roof means 14 is so designed and arranged as to have, usually, about one-half of its periphery, for the longitudinal length thereof, coated with a conventional flexible reflective metal film 24. This reflective metal, such as aluminum, is vacuum deposited or otherwise formed as a very fine film in a known manner over one surface of the layer 22 so that when the laminate is formed, the metal film is embedded within the extremities of the laminate and the plastic sheets forming the tubing maintain their flexibility and transparency except for the area thereof having the metallized coating thereon. This metallized coating extends the length of the tubing and, usually, the metallized layer covers approximately one-half of the square footage surface of the tubing for light reflective purposes, as hereinafter described.

FIG. 4 shows some of the details on how this transparent sheet roofing material is operably positioned in the building. The sheet 16 is shown doubled back on itself and formed into a substantially C-shaped structure in vertical section by the positioning therein of a pair of metal shafts 30, only one of which is clearly shown in the drawing, which shafts are parallel and engage with spaced portions of the interior of the tubular transparent sheet 16. The shafts 30 usually protrude from the tubing at its ends and are suitably journalled by means on the end walls. Normally, the ends of the transparent sheet are sealed in some manner to form an airtight structure which has some air or gas trapped therein to aid in causing the roof means 14 to take the arcuate shape shown and to space the walls of the tube from each other and position them in substantially parallel relation, as indicated in FIG. 4.

This transparent tube 16 is held against surfaces of the shafts 30 as by a driven roller 32 and an idler roller 34 engaging opposed portions of the shaft and pressing spaced parts of the wall of the transparent sheet 16 against this tube, usually on the upper peripheral portion thereof, as indicated in the drawing. Drive for the roller 32 is provided in any conventional manner, as by drive belt 36 connecting to a drive motor 38 and, in turn, operably engaging a drive pulley on a shaft common with the drive roller 32, whereby pressure of the drive roller 32 against the transparent wall of the tube 16 causes the tube to move in an orbital path around its periphery as shaped by the slight pressure therein and by the means including the shafts 30 engaging the same.

A resilient flexible seal member 40 usually is provided between an upper portion of the wall 11 and an adjacent portion of the shaft 30, whereby these seals 40, which can be provided with a variable air pressure therein, if desired, can be brought to engage with and seal against a longitudinally extending portion of the shaft 30 and the part of the transparent tube 16 engaged therewith.

At the end of this transparent sheet or tubing 16, the end wall 12, as shown in FIG. 5, suitably mounts a pair of guides 42 with enclosed slots 44 formed in an inner edge thereof into which are threaded the cable reenforced end 46 of the transparent sheet forming the roof means 14. These end guides 42 or one continuous slightly flexible guide 42 form an endless oval enclosure loop for each tube end. The end or edge 46 has resilient substantially sealed sliding engagement with the slots or recesses 44 and a small inflatable resilient tube 48 is positioned in the slots 44. This tube 48 has a suitable air pressure supply connected thereto to inflate the tube and seal against the edge 46 when the roof is in a stationary operative position. If the guide 42 itself provides an effective seal with the sheet edge then the tube 48 may be omitted.

It will be seen that any desired means can position the transparent sheet or tube 16 so that it is enabled to be driven or rotated in an enclosed complete looped course. This course preferably has the roof means 14 positioned in a substantially C-shape in vertical section, or the roof means could be of other desired contour in section, as desired, but the shape illustrated is preferred.

Usually, the roof means 14 has some suitable anchor members, such as flexible cables 50, that extend over the roof means and are conventionally secured to the support walls 11 in the building. The cables 50 slidably reenforce the flexible roof means 14 whereby it can be rotated to move around a peripheral course and the reinforcing action of the cables or ropes used for such action would not be impaired.

The building 10 is located so that about one-half of the roof means 14, as shown in FIGS. 2a and 2b, normally would have the sun's rays strike the arcuate roof surface.

If inflating air is required within the tube 14, a suitable supply source (not shown) can connect to a bore 80 in the building, and this bore operatively connects to a discharge or transfer bore or tube 82 formed in the shaft 30 of FIG. 5. Any suitable seals and rotary joint means are operatively associated with such shaft and bore air supply means, and the tube 14 may have any suitable pressure such as 1 or 2 pounds therein. Air can be supplied to or released from the tube 14 by such means.

The light reflective area 24 may be of any suitable size. It should be at least about 25% of the area of the tubular roof 14, and as shown in FIG. 2b, it may be of about 50% of such roof area.

While one complete embodiment of the invention has been disclosed herein, it will be appreciated that modification of this particular embodiment of the invention may be restored to without departing from the scope of the invention.

What is claimed is:

1. A solar heated building including roof means comprising a flexible transparent tube of plastic sheeting enclosing the top of the building, rotating means engaging the exterior of said tube to move it around its periphery in endless belt fashion, said tube having a light reflective area and a light transmitting area each extending substantially the length of said tube and being alternately presentable to have the sun's rays reflected therefrom or transmitted therethrough, respectively, said tube of plastic sheeting having a gas sealed therein, and means engaging and operatively sealing the end portions of said tube.

2. A solar heated building as in claim 1 where said positioning means extend the length of said tube and engage opposed side portions thereof and said tube is positioned to move around a defined closed loop course.

3. A solar heated building as in claim 1, where said means to engage and operatively seal the end portions of said tube include a reenforcing means at the ends of said tube, end guides engaging the said reenforcing means for sliding engagement therewith, and means operatively connected to the interior of said tube to supply compressed gas thereto.

4. A solar heated buidling as in claim 3, where an inflatable sealing member is positioned in said end guides to seal said tube end portions therein.

5. A solar heated building as in claim 1 where said tube is a double walled structure and is C-shaped in vertical section, the tube being movable around such C-shaped course.

6. A cover means for a solar heated building comprising:
a plastic tube having a multi-layer wall and closed ends,
a pair of parallel support shafts rotatably positioned within said tube and extending the length thereof, a pair of control roller means positioned outside of said tube and rotatably engaging each of said support shafts to press the wall of said plastic tube thereagainst, said tube being made from a transparent flexible plastic layer and said tube having a longitudinally extending section forming about one-half of its periphery, which section has a coating of a reflective metal thereon whereby the sun's rays can be reflected from the cover means, or be transmitted therethrough dependent on the position of said reflective metal coated portion of said plastic tube in relation to the portion of said cover means having the sun's rays falling thereon; and said plastic tube being movable around its periphery in endless belt fashion by drive of said control roller means.

* * * * *